(12) United States Patent
Kim

(10) Patent No.: US 9,347,511 B2
(45) Date of Patent: May 24, 2016

(54) CONTINUOUS DAMPING CONTROL SHOCK ABSORBER OF DUAL SOLENOID VALVE STRUCTURE

(71) Applicant: MANDO CORPORATION, Pyeongtaek-si (KR)

(72) Inventor: Eun Joong Kim, Yongin-si (KR)

(73) Assignee: MANDO CORPORATION, Pyeongtaek-Si (KR)

( * ) Notice: Subject to any disclaimer, the term of this patent is extended or adjusted under 35 U.S.C. 154(b) by 0 days.

(21) Appl. No.: 14/304,973

(22) Filed: Jun. 15, 2014

(65) Prior Publication Data
US 2015/0047937 A1    Feb. 19, 2015

(30) Foreign Application Priority Data

Aug. 14, 2013   (KR) .......................... 10-2013-0096539

(51) Int. Cl.
| | |
|---|---|
| *F16F 9/34* | (2006.01) |
| *F16F 9/32* | (2006.01) |
| *F16F 9/46* | (2006.01) |
| *F16F 9/18* | (2006.01) |

(52) U.S. Cl.
CPC . *F16F 9/34* (2013.01); *F16F 9/185* (2013.01); *F16F 9/3235* (2013.01); *F16F 9/461* (2013.01)

(58) Field of Classification Search
CPC ........... F16F 9/062; F16F 9/185; F16F 9/187; F16F 9/3235; F16F 9/325; F16F 9/3257; F16F 9/34; F16F 9/461
See application file for complete search history.

(56) References Cited

U.S. PATENT DOCUMENTS 5,649,611 A * 7/1997 Nakadate ................. 188/322.13

FOREIGN PATENT DOCUMENTS

| DE | 4007180 A1 | * | 9/1991 |
|---|---|---|---|
| DE | 4041829 A1 | * | 7/1992 |
| DE | 4130870 A1 | * | 3/1993 |
| KR | 10-2005-0104250 | | 11/2005 |
| KR | 10-2011-0085203 | | 7/2011 |
| KR | 10-2012-0033252 | | 4/2012 |

* cited by examiner

*Primary Examiner* — Anna Momper
(74) *Attorney, Agent, or Firm* — Ladas & Parry, LLP

(57) ABSTRACT

Provided is a continuous damping control shock absorber of a dual solenoid valve structure. The continuous damping control shock absorber of the dual solenoid valve structure includes a rebound solenoid valve and a compression solenoid valve. In the continuous damping control shock absorber, a separator tube for interworking prevention is installed to form a connection chamber at a position where the rebound separator tube and the compression separator tube are connected, thereby preventing interworking of the rebound solenoid valve and the compression solenoid valve 40. A communication hole is formed in the compression separator tube to communicate with the connection chamber. The separator tube for interworking prevention is configured such that the fluid discharged from the rebound solenoid valve flows into not the low-pressure reservoir chamber but the high-pressure compression chamber during the compression stroke, thereby improving the operational independence of the rebound solenoid valve and the compression solenoid valve. Therefore, it is possible to solve the problem that the compression damping force and the rebound damping force are interworked by the opening of the passage of the rebound solenoid valve during the compression stroke, and to effectively prevent a reduction in the compression damping force.

4 Claims, 5 Drawing Sheets

Prior Art

Prior Art

CONTINUOUS DAMPING CONTROL SHOCK ABSORBER OF DUAL SOLENOID VALVE STRUCTURE

CROSS-REFERENCE(S) TO RELATED APPLICATION

This application claims priority of Korean Patent Application No. 10-2013-0096539, filed on Aug. 14, 2013 in the Korean Intellectual Property Office, the contents of which are incorporated herein by reference in its entirety.

BACKGROUND OF THE INVENTION

1. Field of the Invention

The present invention relates to a continuous damping control shock absorber of a dual solenoid valve structure for preventing a reduction in a compression damping force generated when two solenoid valves are applied, and more particularly, to a continuous damping control shock absorber of a dual solenoid valve structure in which a separator tube for interworking prevention is configured such that a fluid discharged from a rebound solenoid valve flows into not a low-pressure reservoir chamber but a high-pressure compression chamber during a compression stroke, thereby preventing a reduction in a compression damping force, which is caused when a passage of the rebound solenoid valve is arbitrarily opened during the compression stroke.

2. Description of the Related Art

A conventional continuous damping control shock absorber of a dual solenoid valve structure will be described briefly with reference to the accompanying drawings.

FIG. 1 is a longitudinal sectional view illustrating a conventional continuous damping control shock absorber of a dual solenoid valve structure, and FIG. 2 is an enlarged view illustrating main parts of FIG. 1.

As illustrated in FIGS. 1 and 2, the conventional continuous damping control shock absorber of the dual solenoid valve structure includes a base shell 11, and an inner tube 13 which is installed inside the base shell 11 and in which a piston rod 12 is movably installed in a length direction.

A rod guide 14 and a body valve 15 are installed in an upper portion and a lower portion of the inner tube 13 and the base shell 11, respectively.

In the inside of the inner tube 13, a piston valve 16 having an oil passage 16a is connected to one end of the piston rod 12, and the piston valve 16 partitions the internal space of the inner tube 13 into a rebound chamber 17 and a compression chamber 18.

A top cap 21 and a base cap 22 are installed in an upper portion and a lower portion of the base shell 11, respectively.

A rebound separator tube 23 and a compression separator tube 24 are installed in an upper portion and a lower portion between the inner tube 13 and the base shell 11, respectively.

The rebound separator tube 23 and the compression separator tube 24 form a reservoir chamber 25 that compensates for a change in the internal volumes of the rebound chamber 17 and the compression chamber 18 according to a reciprocating motion of the piston rod 12 in the inside of the base shell 11.

In order to vary a damping force, a rebound solenoid valve 30 and a compression solenoid valve 40 serving as damping force variable valves are installed at one side and the other side of the base shell 11, respectively.

During a rebound stroke, the rebound separator tube 23 serves to circulate a fluid of the rebound chamber 17 through the rebound solenoid valve 30 and guide the fluid to the reservoir chamber 25. During a compression stroke, the rebound separator tube 23 serves to circulate the fluid through the rebound solenoid valve 30 and guide the fluid of the reservoir chamber 25 again to the rebound chamber 17.

An inner hole 13a is formed in an upper portion of the inner tube 13 to communicate with a chamber C1, that is, a space formed between the rebound chamber 17 and the rebound separator tube 23.

An inner hole 13b is formed in a lower portion of the inner tube 13 to communicate with a chamber C2, that is, a space formed between the compression chamber 18 and the compression separator tube 24.

The rebound solenoid valve 30 is connected to the rebound chamber 17 through the inner hole 13a, and the compression solenoid valve 40 is connected to the compression chamber 18 through the inner hole 13b.

During the compression stroke, the compression separator tube 24 circulates the fluid of the compression chamber 18 through the compression solenoid valve 40 and guides the fluid to the reservoir chamber 25.

Due to the rebound separator tube 23, the inside of the base shell 11 is partitioned into a high-pressure chamber PH connected to the rebound chamber 17, and a low-pressure chamber PL serving as the reservoir chamber 25.

Due to the compression separator tube 24, the inside of the base shell 11 is partitioned into a high-pressure chamber PH connected to the compression chamber 18, and a low-pressure chamber PL serving as the reservoir chamber 26.

The rebound and compression high-pressure chambers PH are connected to the rebound chamber 17 and the compression chamber 18 through the inner holes 13a and 13b of the inner tube 13, respectively.

The low-pressure chamber PL of the compression solenoid valve 40 is connected to a passage of the body valve 15 through a lower passage 32 formed between the body valve 15 and the base shell 11.

The operation of the conventional continuous damping control shock absorber of the dual solenoid valve structure as configured above will be described below.

During the compression stroke, when the piston rod 12 moves downward, the fluid (oil) of the compression chamber 18 is compressed, and the inside of the compression chamber 18 becomes high-pressure. Therefore, a part of the fluid existing in the compression chamber 18 circulates through the compression solenoid valve 40 via the inner hole 13b and moves to the low-pressure reservoir chamber 25, and other fluid is introduced into the rebound chamber 17 through the oil passage 16a.

During the rebound stroke, when the piston rod 12 moves upward, the fluid (oil) of the rebound chamber 17 is compressed, and the inside of the rebound chamber 17 becomes high-pressure. Therefore, a part of the fluid existing in the rebound chamber 17 circulates through the rebound solenoid valve 30 via the inner hole 13a, and other fluid is introduced into the compression chamber 18 through the oil passage 16b.

A damping force is varied when the fluid is circulated through a series of procedures while undergoing the compression stroke and the rebound stroke.

However, in the conventional continuous damping control shock absorber of the dual solenoid valve structure, the fluid of the compression chamber 18 is bypassed to the rebound chamber 17 through the oil passage 16a of the piston valve 16 during the compression stroke. At this time, the passage of the rebound solenoid valve 30 connected to the reservoir chamber 25 being relatively lower pressure than the rebound chamber 17 is arbitrarily opened. Therefore, since a damping force interworks with the rebound solenoid valve 30 during the compression stroke, the independence of the compression solenoid valve 40 is deteriorated.

In order to solve this problem, as described above, there has been proposed a structure that increases oil passage intake stiffness of the piston valve to prevent the fluid of the high-pressure compression chamber 18 from flowing into the low-pressure rebound chamber 17 during the compression stroke. However, this structure has a problem that lag phenomenon occurs at the time of the change from the compression stroke to the rebound stroke due to the generation of a negative pressure in the rebound chamber 17. Therefore, there is a need for technologies that can prevent a reduction in a compression damping force by preventing the occurrence of lag phenomenon and independently performing a compression mode and a rebound mode without interworking (or interference).

CITATION LIST

Patent Literature (Patent Literature 1) Korean Patent Publication No. 10-2011-0085203 (Valve Structure of Shock Absorber)

(Patent Literature 2) Korean Patent Publication No. 10-2005-0104250 (Damping Force Adjustable Shock Absorber)

(Patent Literature 3) Korean Patent Publication No. 10-2012-0033252 (Damper)

SUMMARY OF THE INVENTION

The present invention has been made in an effort to solve the above problems and is directed to provide a continuous damping control shock absorber of a dual solenoid valve structure, which is capable of effectively preventing a reduction in a compression damping force by improving the operational independence of a rebound solenoid valve and a compression solenoid valve.

According to the present invention, a continuous damping control shock absorber of a dual solenoid valve structure having a rebound solenoid valve and a compression solenoid valve includes: a separator tube for interworking prevention, which is installed to form a connection chamber at a position where the rebound separator tube and the compression separator tube are connected, thereby preventing interworking of the rebound solenoid valve and the compression solenoid valve; and a communication hole which is formed in the compression separator tube to communicate with the connection chamber.

The separator tube for interworking prevention is configured such that the fluid (oil) discharged from the rebound solenoid valve flows into not the low-pressure reservoir chamber but the high-pressure compression chamber during the compression stroke, thereby preventing the interworking (that is, interference) of the rebound solenoid valve and the compression solenoid valve.

According to the present invention, there is provided a continuous damping control shock absorber of a dual solenoid valve structure, in which an inner tube is installed inside a base shell constituting an outer appearance; a piston rod is movably installed in the inner tube in a length direction; in the inside of the inner tube, a piston valve having an oil passage is connected to one end of the piston rod, and the piston valve partitions the internal space of the inner tube into a rebound chamber and a compression chamber; a rebound separator tube and a compression separator tube are installed in an upper portion and a lower portion between the inner tube and the base shell, respectively; the rebound separator tube and the compression separator tube form a reservoir chamber that compensates for a change in the internal volumes of the rebound chamber and the compression chamber according to a reciprocating motion of the piston rod in the inside of the base shell; in order to vary a damping force, a rebound solenoid valve and a compression solenoid valve are installed at one side and the other side of the base shell, respectively; and the rebound solenoid valve is connected to the rebound chamber through the inner hole, and the compression solenoid valve is connected to the compression chamber through the inner hole. In the continuous damping control shock absorber, the fluid discharged from the rebound solenoid valve is not discharged to the low-pressure reservoir chamber but flows into the high-pressure compression chamber. In order to prevent the interworking of the rebound damping force and the compression damping force, the separator tube for interworking prevention is installed to form the connection chamber at a position where the rebound separator tube and the compression separator tube are connected. The communication hole is formed in the compression separator tube to communicate with the connection chamber.

DETAILED DESCRIPTION OF EXEMPLARY EMBODIMENTS

Hereinafter, a continuous damping control shock absorber of a dual solenoid valve structure according to a preferred embodiment of the present invention will be described in detail with reference to the accompanying drawings.

Figure 1:
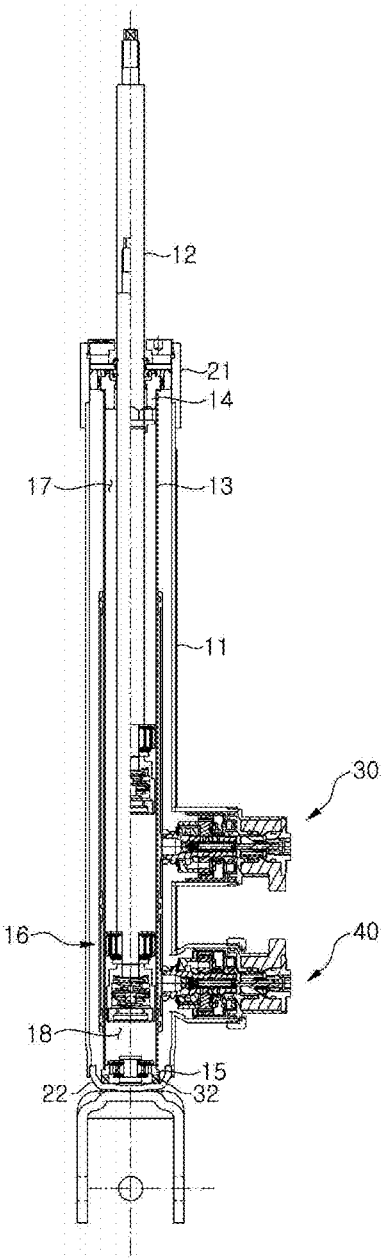
FIG. 1 is a longitudinal sectional view illustrating a conventional continuous damping control shock absorber of a dual solenoid valve structure.
Figure 2:
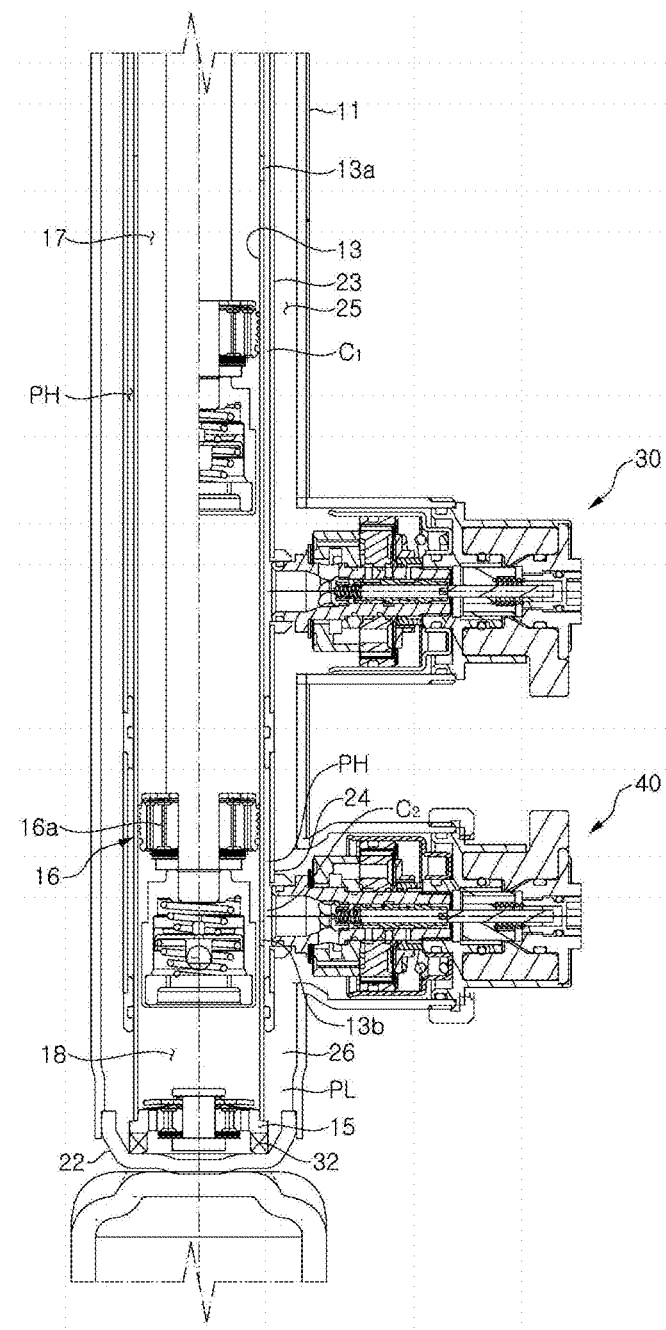
FIG. 2 is an enlarged view illustrating main parts of FIG. 1.
Figure 3:
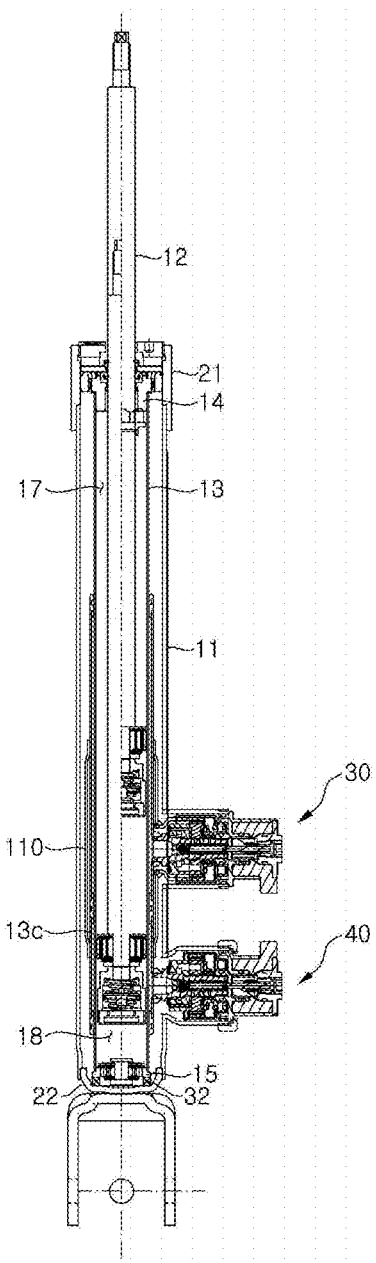
FIG. 3 is a longitudinal sectional view illustrating a continuous damping control shock absorber of a dual solenoid valve structure according to a preferred embodiment of the present invention.
Figure 4:
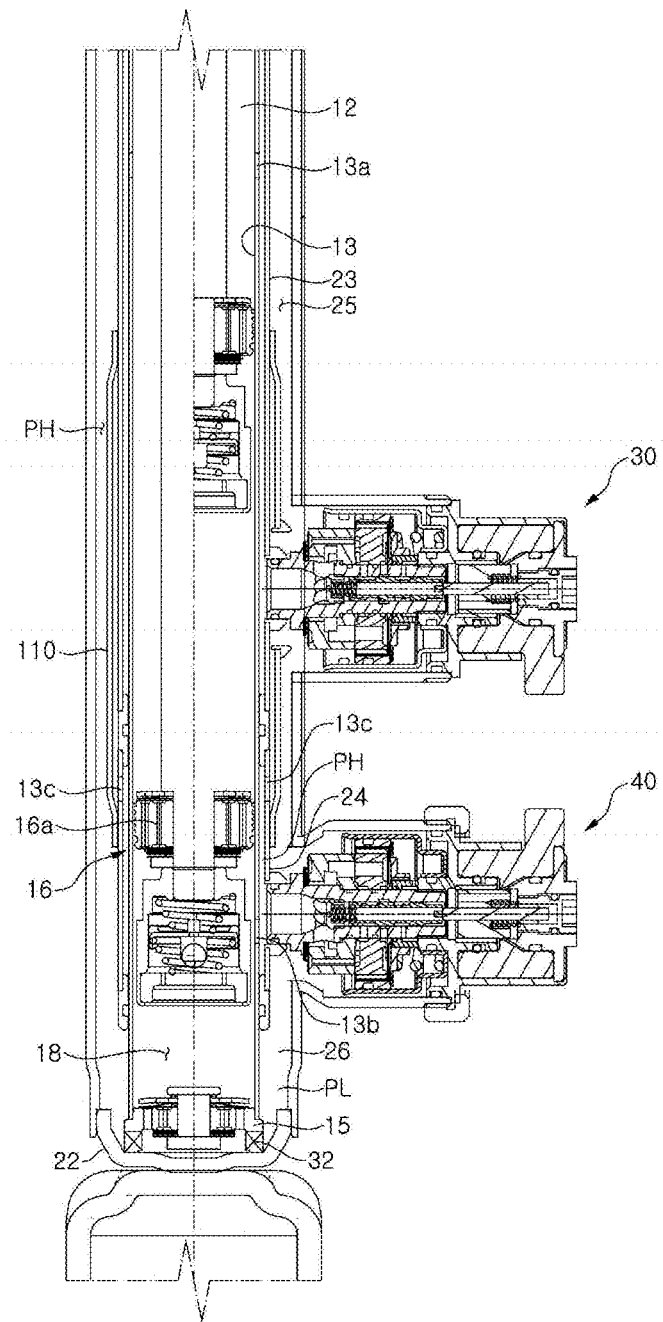
FIG. 4 is an enlarged view illustrating main parts of FIG. 3.
Figure 5:
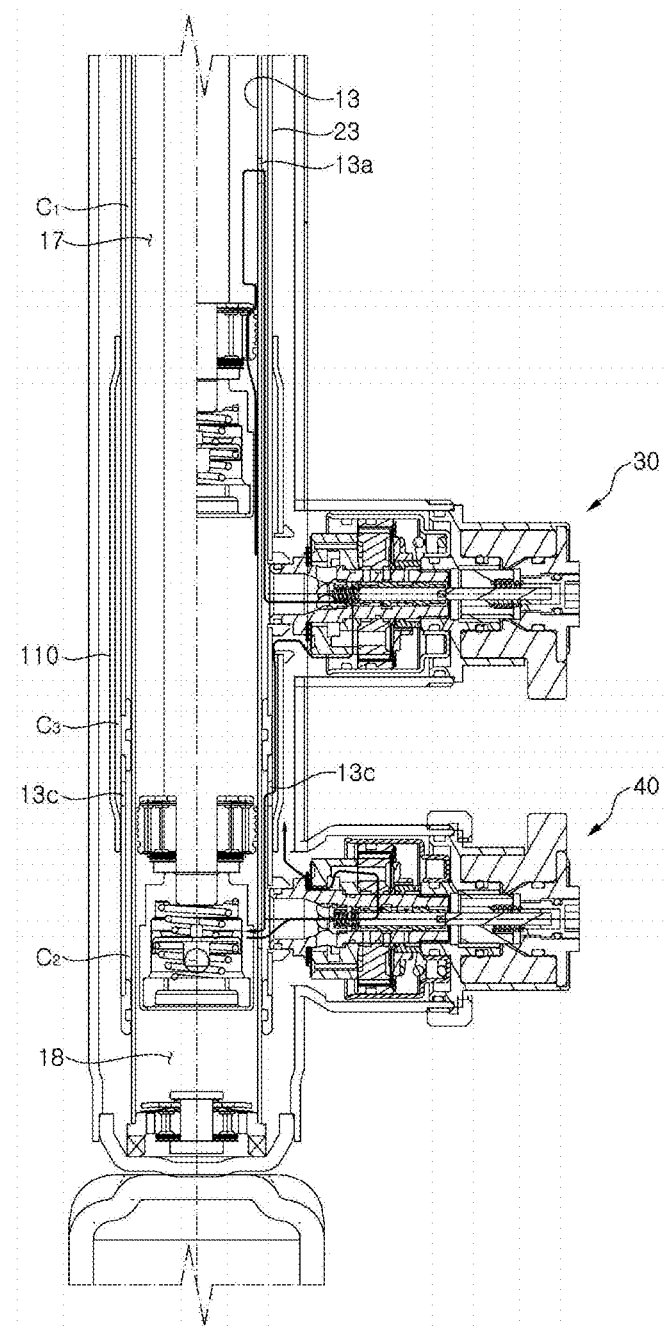
FIG. 5 is a longitudinal sectional view explaining the prevention of interworking of a rebound solenoid valve and a compression solenoid valve during a compression stroke in the continuous damping control shock absorber of the dual solenoid valve structure according to the preferred embodiment of the present invention.

FIG. 3 is a longitudinal sectional view illustrating a continuous damping control shock absorber of a dual solenoid valve structure according to a preferred embodiment of the present invention, FIG. 4 is an enlarged view illustrating main parts of FIG. 3, and FIG. 5 is a longitudinal sectional view explaining the prevention of interworking of a rebound solenoid valve and a compression solenoid valve during a compression stroke in the continuous damping control shock absorber of the dual solenoid valve structure according to the preferred embodiment of the present invention.

Referring to FIGS. 3 to 5, the continuous damping control shock absorber of the dual solenoid valve structure according to the preferred embodiment of the present invention includes a rebound solenoid valve 30 and a compression solenoid valve 40.

In the continuous damping control shock absorber of the dual solenoid valve structure according to the preferred embodiment of the present invention, a separator tube 110 for interworking prevention is installed to form a connection chamber C3 at a position where a rebound separator tube 23 and a compression separator tube 24 are connected, thereby preventing the interworking of the rebound solenoid valve 30 and the compression solenoid valve 40. A communication hole 13c is formed in the compression separator tube 24 to communicate with the connection chamber C3.

During a compression stroke, a fluid discharged from the rebound solenoid valve 30 flows into not a low-pressure reservoir chamber 25 but a high-pressure compression chamber 18, thereby preventing the interworking of the rebound solenoid valve 30 and the compression solenoid valve 40.

Hereinafter, the continuous damping control shock absorber of the dual solenoid valve structure according to the preferred embodiment of the present invention will be described in more detail.

An inner tube 13 is installed inside a base shell 11 constituting an outer appearance. A piston rod 12 is movably installed in the inner tube 13 in a length direction.

In the inside of the inner tube 13, a piston valve 16 having an oil passage 16a is connected to one end of the piston rod 12. The piston valve 16 partitions the internal space of the inner tube 13 into a rebound chamber 17 and a compression chamber 18.

The rebound separator tube 23 and the compression separator tube 24 are installed in an upper portion and a lower portion between the inner tube 13 and the base shell 11, respectively.

The rebound separator tube 23 and the compression separator tube 24 form a reservoir chamber 25 that compensates for a change in the internal volumes of the rebound chamber 17 and the compression chamber 18 according to a reciprocating motion of the piston rod 12 in the inside of the base shell 11.

In addition, in order to vary a damping force, the rebound solenoid valve 30 and the compression solenoid valve 40 are installed in one side and the other side of the base shell 11, respectively.

The inner hole 13a is formed in an upper portion of the inner tube 13 to communicate with a chamber C1, that is, a space formed between the rebound chamber 17 and the rebound separator tube 23.

The inner hole 13b is formed in a lower portion of the inner tube 13 to communicate with a chamber C2, that is, a space formed between the compression chamber 18 and the compression separator tube 24.

The rebound solenoid valve 30 is connected to the rebound chamber 17 through the inner hole 13a, and the compression solenoid valve 40 is connected to the compression chamber 18 through the inner hole 13b.

In the continuous damping control shock absorber of the dual solenoid valve structure according to the preferred embodiment of the present invention, the fluid discharged from the rebound solenoid valve 30 is not discharged to the low-pressure reservoir chamber 25 but flows into the high-pressure compression chamber 18. Therefore, a reduction in the compression damping force can be prevented by improving the operational independency, that is, by preventing the interworking of the compression solenoid valve 40 and the rebound solenoid valve 30.

That is, in order to prevent the interworking of the rebound solenoid valve 30 and the compression solenoid valve 40, the separator tube 110 for interworking prevention is installed to form the connection chamber C3 at a position where the rebound separator tube 23 and the compression separator tube 24 are connected. The communication hole 13c is formed in the compression separator tube 24 to communicate with the connection chamber C3.

The separator tube 110 for interworking prevention is disposed to surround a lower outer side of the rebound separator tube 23 and an upper outer side of the compression separator tube 24.

The operation of the continuous damping control shock absorber of the dual solenoid valve structure according to the preferred embodiment of the present invention will be described below.

First, when the piston rod 12 moves upward during the rebound stroke, the rebound chamber 17 becomes high pressure and the compression chamber 18 becomes low pressure. At this time, the damping force is controlled in such a manner that a part of the fluid existing in the rebound chamber 17 circulates through the rebound solenoid valve 30 via the inner hole 13a and the connection chamber C1, and other fluid is introduced into the compression chamber 18 through the oil passage 16a.

When the piston rod 12 moves downward during the compression stroke, the compression chamber 18 becomes high pressure. The fluid existing in the compression chamber 18 circulates through the compression solenoid valve 40 via the inner hole 13b and the connection chamber C2.

In this case, due to the separator tube 110 for interworking prevention, the fluid discharged from the rebound solenoid valve 30 is not discharged to the low-pressure reservoir chamber 25 but flows into the high-pressure compression chamber 18. Since the fluid cannot flow from low pressure to high pressure, the passage through the rebound solenoid valve 30 is structurally blocked during the compression stroke.

Therefore, it is possible to effectively solve the interworking of the compression solenoid valve 40 and the rebound solenoid valve 30, which is caused by the opening of the passage of the rebound solenoid valve 30 during the compression stroke.

As described above, the separator tube for interworking prevention is configured such that the fluid discharged from the rebound solenoid valve flows into not the low-pressure reservoir chamber but the high-pressure compression chamber during the compression stroke, thereby improving the operational independence (interference prevention) of the rebound solenoid valve and the compression solenoid valve. Therefore, it is possible to solve the problem that the compression damping force and the rebound damping force are interworked by the opening of the passage of the rebound solenoid valve during the compression stroke, and to effectively prevent a reduction in the compression damping force.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

11: base shell
12: piston rod
13: inner tube
13a: inner hole
13b: inner hole
13c: communication hole
16: piston valve
16a: oil passage
17: rebound chamber
18: compression chamber
23: rebound separator tube
24: compression separator tube -continued 25: reservoir chamber
30: rebound solenoid valve
40: compression solenoid valve
110: separator tube for interworking prevention

What is claimed is:

1. A continuous damping control shock absorber of a dual solenoid valve structure having a rebound solenoid valve and a compression solenoid valve, the continuous damping control shock absorber comprising:
   a separator tube for interworking prevention, which is installed to form a connection chamber at a position where a rebound separator tube and a compression separator tube are connected, thereby preventing interworking of the rebound solenoid valve and the compression solenoid valve; and
   a communication hole which is formed in a cylindrical side surface of the compression separator tube to communicate with the connection chamber.

2. The continuous damping control shock absorber according to claim 1, wherein, the separator tube for interworking prevention is configured to cause a fluid discharged from the rebound solenoid valve to flow into not a low-pressure reservoir chamber but a high-pressure compression chamber, thereby preventing the interworking of the rebound solenoid valve and the compression solenoid valve.

3. The continuous damping control shock absorber according to claim 1, wherein the separator tube for interworking prevention is installed at a position surrounding a lower portion of the rebound separator tube and an upper portion of the compression separator tube.

4. A continuous damping control shock absorber of a dual solenoid valve structure, comprising:
   a separator tube for interworking prevention, which is installed to form a connection chamber at a position where a rebound separator tube and a compression separator tube are connected,
   wherein:
      the separator tube for interworking prevention is configured to cause a fluid discharged from a rebound solenoid valve to flow into not a low-pressure reservoir chamber but a high-pressure compression chamber, and
      a communication hole is formed in a cylindrical side surface of the compression separator tube to communicate with the connection chamber.

\* \* \* \* \*